United States Patent
Nijhawan et al.

(10) Patent No.: US 6,697,920 B2
(45) Date of Patent: Feb. 24, 2004

(54) EXTENDED UPPER MEMORY BLOCK MEMORY MANAGER

(75) Inventors: Vijay B. Nijhawan, Bellevue, WA (US); Hon Fei Chong, Santa Cruz, CA (US)

(73) Assignee: Phoenix Technologies Ltd., Milpitas, CA (US)

(*) Notice: Subject to any disclaimer, the term of this patent is extended or adjusted under 35 U.S.C. 154(b) by 190 days.

(21) Appl. No.: 10/057,861

(22) Filed: Jan. 24, 2002

(65) Prior Publication Data

US 2003/0149828 A1 Aug. 7, 2003

(51) Int. Cl.[7] .............................................. G06F 12/06
(52) U.S. Cl. ............................. 711/153; 713/2; 713/1; 711/170; 711/173; 711/166
(58) Field of Search ............................ 709/104; 713/1, 713/2; 365/189.01, 218; 711/5, 102, 153, 166, 170, 173, 221, 2

(56) References Cited

U.S. PATENT DOCUMENTS 5,978,903 A * 11/1999 Quimby et al. ............. 712/229

FOREIGN PATENT DOCUMENTS

JP 2002342158 A * 11/2002 ........... G06F/12/06

* cited by examiner

Primary Examiner—B. James Peikari

(57) ABSTRACT

A memory manager, method and computer system that allows use of Extended Upper Memory Block (XUMB) memory space by system BIOS to store runtime code and data. In an exemplary memory manager, BIOS Power-On-Self-Test (POST) code sets up or allocates 1 the XUMB memory space at TP_SETUP_WAD (0D3h). The BIOS code finds space for the XUMB memory space in an extended memory space. The BIOS code then zeroes out the XUMB memory space and stores the address of the XUMB memory space in a variable. When different components of the BIOS code need to reserve memory in the XUMB memory space, they call a predetermined calling function. The calling function reserves memory for each of the different components in the XUMB memory space and allocates pointers to the specific addresses that may be used by these components. The BIOS components then copy their own data into these memory locations of the XUMB memory space.

9 Claims, 2 Drawing Sheets

MEMORY MAP OF A SYSTEM WITH XNUM AND TSEG

MEMORY MAP OF A SYSTEM WITH XNUM AND TSEG

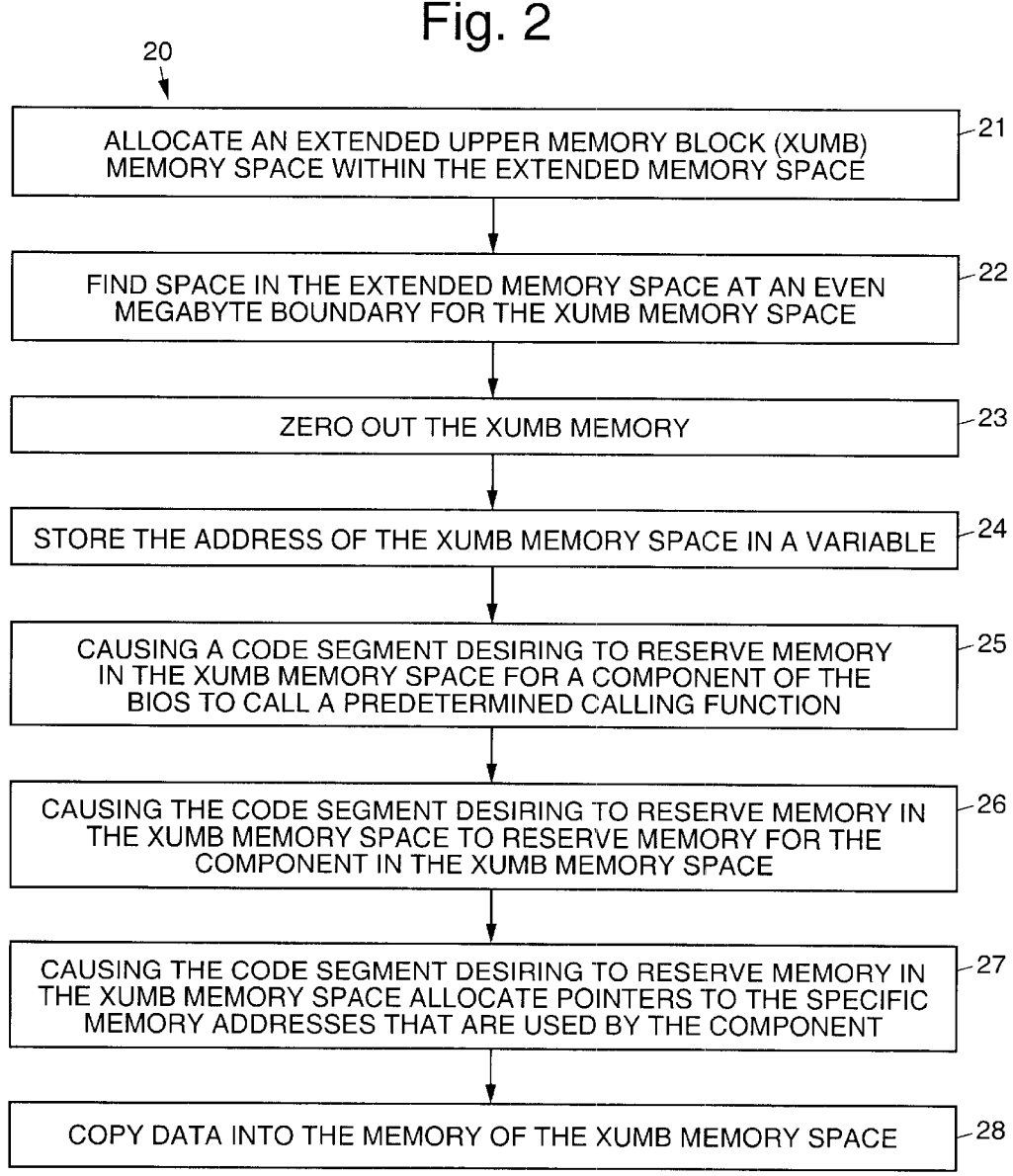

EXTENDED UPPER MEMORY BLOCK MEMORY MANAGER

BACKGROUND

The present invention relates generally to computer systems and methods, and more particularly, to a computer implemented memory manager for using an Extended Upper Memory Block (XUMB) for storing runtime code and data.

The development of modern operating systems require the use of more and more memory space below 1 MB. The BIOS is an expanding entity, due to the recent addition of ACPI, USB, 1394, and USB 2.0 components, for example. BIOS cannot use UMB (Upper Memory Block) space, which is memory just below 1 MB, because if BIOS does this, there will not be any space for optional read-only-memory (OPROM) to load. Also, BIOS cannot take memory from the conventional memory space because some applications and certain operating systems (such as Japanese DOS, for example) fail to boot if there is less conventional memory in the system. The present invention has been developed to solve these problems.

In addition, some chipsets have limited shadow capabilities, and it is impossible to allocate just 16 KB for USB because shadow granularity is 64 KB. This leaves very little room for option ROMs, for example. Finally, other chipsets have problems with Direct Memory Access (DMA) into the C0000–FFFFF region, so this memory area cannot be used for USB, for example.

It is therefore an objective of the present invention to provide for a memory manager, method and computer system that allows use of XUMB memory space by system BIOS to store runtime code and data.

SUMMARY OF THE INVENTION

To accomplish the above and other objectives, the present invention provides for a memory manager (implemented as software code), a method and a computer system that allows use of an Extended Upper Memory Block (XUMB), referred to as XUMB memory space, to store runtime code and data. A reduced-to-practice embodiment of the memory manager is implemented in Phoenix BIOS developed by the assignee of the present invention, but may be implemented in any BIOS or operating system (OS).

The XUMB memory space is above 1 MB. The XUMB memory space in an Advanced Configuration and Power Interface (ACPI) system, for example, consists of an ACPI NVS area and an ACPI Reclaim area. The ACPI NVS area generally has ACPI NVS tables (such as a Fixed ACPI Control Structure (FACS) and a Secondary System Description Table (SSDT), for example) and memory area reserved by USB (Universal Serial Bus), IEEE-1394, and Boot Integrity Services (BIS) components, for example.

A reduced-to-practice embodiment of the Phoenix BIOS that implements the present memory manager marks the XUMB memory space as reserved so that the operating system and any other driver does not destroy it. Embodiments of the Phoenix BIOS implementing the present memory manager allow USB Frame lists and other data segments, for example, to be stored in the XUMB memory area.

The XUMB memory space is an extended memory area reserved by the basic input/output system (BIOS) of a computer system. This area is near the top of memory (TOM) of the system. BIOS Power-On-Self-Test (POST) code finds the top or memory (TOM) and then finds any reserved memory near the TOM and any memory holes in the chipset. After this, the BIOS reserves maximum XUMB memory. Maximum XUMB memory in Phoenix BIOS, developed by the assignee of the present invention, can go up to 1 MB, but the actual size of the XUMB memory space depends on the BIOS components that are installed in the computer system.

An exemplary memory manager is implemented as follows. BIOS Power-On-Self-Test (POST) code sets up or allocates the XUMB memory space. The XUMB memory space is set up at TP_SETUP_WAD (0D3h). The BIOS code finds space in extended (main) memory space. The BIOS code then zeroes out the XUMB memory space and stores the address of the XUMB memory space in a variable.

When different components of the BIOS code need to reserve memory in the XUMB memory space, they call a predetermined calling function (referred to as "coreE820AllocateWAD"). This calling function reserves memory for each of the different BIOS components in the XUMB memory space and allocates pointers to the specific address that may be used by these components. The BIOS components then copy their own data in these memory locations of the XUMB memory space.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 2 is a flow diagram that illustrates an exemplary memory manager in accordance with the principles of the present invention.

DETAILED DESCRIPTION

Figure 1:
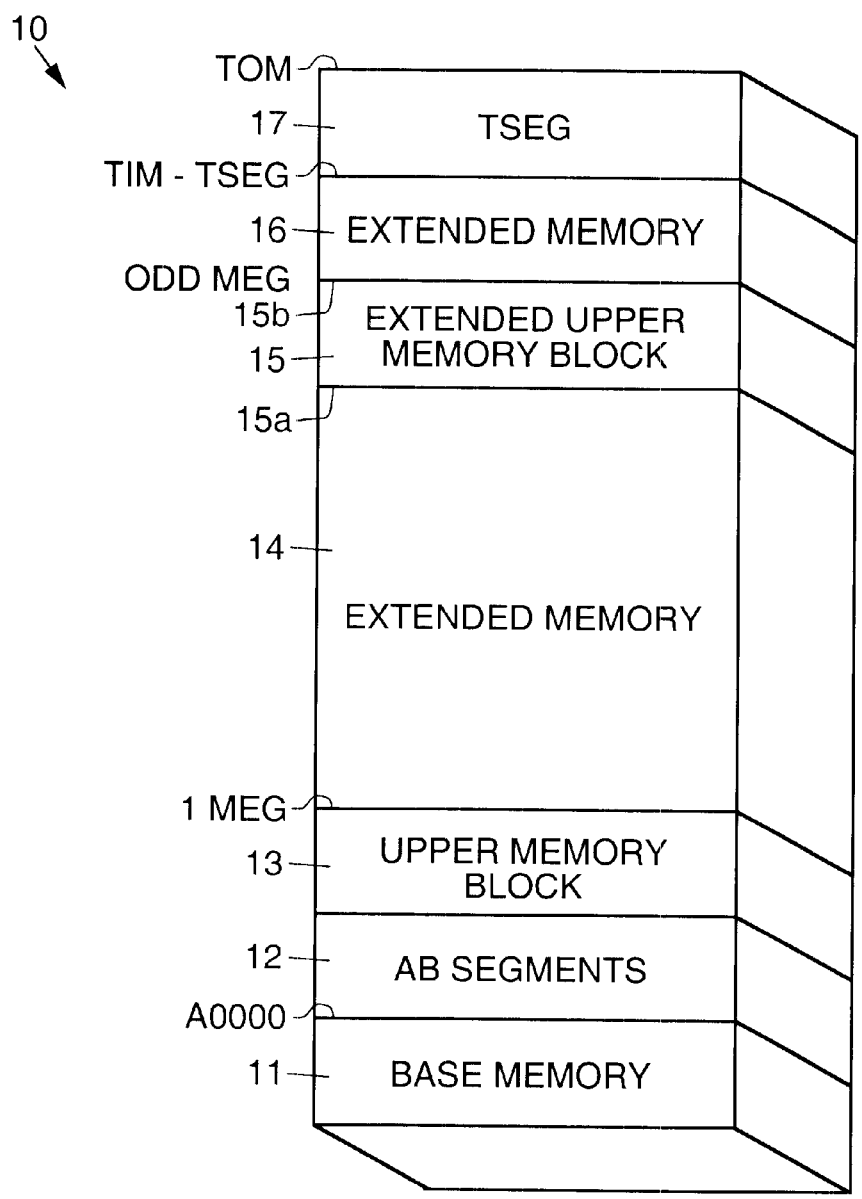
FIG. 1 illustrates a memory map of a computer system using XUMB memory space in accordance with the principles of the present invention.

Referring to the drawing figures, FIG. 1 illustrates a memory map of a computer system 10 using an Extended Upper Memory Block (XUMB) 15, referred to as XUMB memory space 15, in accordance with the principles of the present invention. The memory in the computer system 10 includes a base memory space 11 which is located below A0000, AB memory segments 12 which are located above the base memory space 11, and UMB (Upper Memory Block) memory space 13 which is located above the AB memory segments 12 and below 1 Megabyte. The AB memory segments 12 provide memory space that is used by a VGA controller.

An extended memory space 14 is located above 1 Megabyte and above the UMB (Upper Memory Block) memory space 13. The Extended Upper Memory Block (XUMB) memory space 15 implemented in accordance with the present invention is located above the extended memory space 14 and below TSEG 17. The Extended Upper Memory Block (XUMB) memory space 15 starts at a lower boundary 15a and ends at an upper boundary 15b. A TSEG memory space 17 is located above the extended memory space 14 and below the top of memory (TOM).

FIG. 2 is a flow diagram that illustrates an exemplary memory manager 20 in accordance with the principles of the present invention. A reduced-to-practice embodiment of the Phoenix BIOS has been developed that implements the memory manager 20. The exemplary memory manager 20 is implemented as follows.

BIOS Power-On-Self-Test (POST) code sets up 21 or allocates 21 the XUMB memory space 15. The memory space 15 is set up 21 at TP_SETUP_WAD (0D3h). The BIOS code finds 22 space in the extended (main) memory space 14 for the XUMB memory space 15. The BIOS code then zeroes out 23 the XUMB memory space 15 and stores 24 the address of the XUMB 15 in a variable.

When different components of the BIOS code need to reserve memory in the XUMB memory space 15, they call 25 a predetermined calling function (referred to as "coreE820AllocateWAD"). This calling function reserves 26 memory for each of the different components in the XUMB memory space 15 and allocates 27 pointers to the specific address that may be used by these components. The BIOS components then copy 28 their own data in these memory locations of the XUMB memory space 15.

More particularly, the exemplary memory manager 20 allocates 21 XUMB memory space 15 in 4 KB memory blocks. The 4 KB size of the memory blocks guarantee alignment of data allocated in the buffer (the XUMB memory space 15). Some code, such as USB code, for example requires that the data area be aligned to a certain boundary. The BIOS Power-On-Self-Test (POST) code sets up 21 or allocates 21 the XUMB memory space 15 at TP_SETUP_WAD (0D3hMB. After allocating the XUMB memory space 15, the BIOS zeroes out 23 the XUMB memory space 15 and stores 24 the address of the XUMB memory space 15 in a variable.

The table below is a sample BIOS memory map usage of a typical BIOS.

discussion of how one can add a request to allocate the XUMB memory space 15.

Allocation of ACPI NVS XUMB Memory Space 15.

To allocate XUMB NVS memory space 15, a Caller (calling application) calls a coreE820AllocateWAD function.

CX 4 KBs to allocate (may be zero). Below is sample code allocating the XUMB memory space 15.

Mov cx, (SIZE sb1394Wad)
Call coreE820AllocateWad; [ECX]—4 KB-aligned 4 KB space.

This call returns zero if the call has failed, else it returns the base address of the area. The call can fail either because there is not enough memory, or because the call is made too early during POST. The use of jump if CX equal to zero (JECXZ), is an easy way to test success. The area to be tested has already been zeroed by coreE820LocateWad, and is 4 KB-aligned.

Allocation of ACPI Reclaim XUMB Memory.

To allocate XUMB NVS memory, the Caller (calling application) calls the coreE820AllocateWAD function.

CX=4 KBs to allocate (may be zero). Set bit 15 to report this area as ACPI Reclaim. Below is sample code allocating the XUMB memory space 15.

Or ch, 80h; set bit 15 to allocate this area as a reclaim XUMB area
call coreE820AllocateWad; [ECX]—4 KB-aligned 4 KB space.

This call returns zero if the call has failed, else returns the base address of the areaThe call can fail either because there is not enough memory, or because the call is made too early

| # | Address | Length | Ending Address | Memory Type |
|---|---------|--------|----------------|-------------|
| 01h: | 00000000h (0.00 b) | 0009F800h (638.00 Kb) | 0009F800h (638.00 Kb) | 1 |
| 02h: | 0009F800h (638.00 Kb) | 00000800h (2.00 Kb) | 000A0000h (640.00 Kb) | 2 |
| 03h: | 000C8000h (800.00 Kb) | 00038000h (224.00 Kb) | 00100000h (1.00 Mb) | 2 |
| 04h: | 00100000h (1.00 Mb) | 0FDF0000h (253.94 Mb) | 0FEF0000h (254.94 Mb) | 1 |
| 05h: | 0FEF0000h (254.94 Mb) | 00007000h (28.00 Kb) | 0FEF7000h (254.96 Mb) | 3 |
| 06h: | 0FEF7000h (254.96 Mb) | 00009000h (36.00 Kb) | 0FF00000h (255.00 Mb) | 4 |
| 07h: | 0FF00000h (255.00 Mb) | 00080000h (512.00 Kb) | 0FF80000h (255.50 Mb) | 1 |
| 08h: | 0FF80000h (255.50 Mb) | 00080000h (512.00 Kb) | 10000000h (256.00 Mb) | 2 |
| 09h: | FEC00000h (4076.00 Mb) | 00010000h (64.00 Kb) | FEC10000h (4076.06 Mb) | 2 |
| 0Ah: | FEE00000h (4078.00 Mb) | 00001000h (4.00 Kb) | FEE01000h (4078.00 Mb) | 2 |
| 0Bh: | FFF80000h (4095.50 Mb) | 00080000h (512.00 Kb) | 00000000h (0.00 b) | 2 |

Memory Type 1 = Available RAM memory.
Memory Type 2 = BIOS Reserved memory.
Memory Type 3 = ACPI Reclaim reserved memory.
Memory Type 4 = ACPI NVS Reserved memory.

Allocation of XUMB Memory.

XUMB memory space 15 includes an ACPI NVRAM table and ACPI Reclaim tables. The operating system reclaims an ACPI Reclaim area after it reads the ACPI tables. ACPI NVS memory reserved by the BIOS is not reclaimed by the operating system. This range is required to be saved and restored across S1 to S4 (NVS) sleep states.

Most of the BIOS components that use the XUMB memory space 15, reserve memory in the ACPI NVS area. Some components that need XUMB memory space 15 before the operating system switches to ACPI mode, can also use the ACPI Reclaim area. For example, Boot Integrity Services (BIS) claims the Reclaim area of the XUMB memory space 15, since BIS does not need this memory once the operating system is booted. Presented below is a during POST. The use of jump if CX equal to zero (JECXZ), is an easy way to test success. The area to be tested has already been zeroed by coreE820LocateWad, and is 4 KB-aligned.

Restriction on Allocating ACPI Reclaim XUMB Memory.

The Phoenix BIOS currently allows only one place to call the coreE820AllocateWad function to allocate Reclaim memory. This current call is in ACPI core code. However, the Phoenix BIOS allows different components to allocate the XUMB Reclaim area in the following way.

Below is sample code that allocates the reclaim area.

```
runTimeSegment        SEGMENT
saveTheBISAddres      DWORD  0
lengthOfBIS  DWORD           66036    ; This length depends on
                                      ; reclaim space
                                      : requirement
runTimeSegment        ENDS
REGISTER_ACPI_FN ALLOCATE_RECLAIM, allocateBISArea
allocateBISArea       PROC NEAR PUBLIC USES ds
ASSUME    ds:BCG
mov       ds, cs:acpiBCGSegment
add       ebx, [lengthOfBIS]      ; Pass the new pointer to
                                  ; subsequent routine
sub       eax, [lengthOfBIS]      ; lengthOfBIS is the amount
                                  ; of reclaim memory requested
                                  ; by the function.
mov       [saveTheBISAddress], eax; save the reclaim memory
                                  ; pointer used by this feature
ret
allocateBISArea       ENDP
acpiSegment  ENDS
```

A BIOS component that wants to allocate the XUMB Reclaim area uses the above calling convention. A requester for the XUMB reclaim area registers the function that wants to allocate the XUMB memory space 15 using a REGISTER_ACPI_FN macro with ALLOCATE_RECLAIM as the first argument. A second argument of the routine is the name of the function that allocates the XUMB memory space 15. Above is sample code that allocates the "lengthOfBIS" length in the XUMB Reclaim area.

The XUMB Memory is Operating System Safe.

Memory allocated by the XUMB memory manager 20 is either part of the ACPI NVS area or part of the ACPI Reclaim area. This information is reported to the operating system by interrupt 15 function calls listed below. All modern day operating systems use one or more of these functions calls to find the amount of memory installed in the system.

System—Get Extended Memory Size (286+)

INT 15, AH=88h

Return:

CF clear if successful

AX=number of contiguous KB starting at absolute address 100000h

CF set on error

AH=status 80h invalid command (PC,PCjr)

86h unsupported function (XT,PS30)

The standard BIOS only returns memory between 1 MB and 16 MB. Some releases of HIMEM.SYS are limited to use only 15 MB, even when this function reports more.

Get Memory Size for >64 MB Configurations

INT 15, AX=E801h

Return:

CF clear, if successful

AX=extended memory between 1M and 16M, in K (max 3C00h=15 MB)

BX=extended memory above 16M, in 64K blocks

CX=configured memory 1M to 16M, in K

DX=configured memory above 16M, in 64K blocks

CF set on error

The above interface is used by Windows NT 3.1, OS/2 v2.11/2.20, and is used as a fall-back by newer versions of operating systems if AX=E820h is not supported.

Newer BIOS Versions—Get System Memory Map

Int 15

AX=E820h

EAX=0000E820h

EDX=534D4150h ('SMAP')

EBX=continuation value or 00000000h to start at beginning of map

ECX=size of buffer for result, in bytes (should be >=20 bytes)

ES:DI->buffer for result.

Return:

CF clear if successful

EAX=534D4150h ('SMAP')

ES:DI buffer filled

EBX=next offset from which to copy or 00000000h if all done

ECX=actual length returned in bytes

CF set on error

AH=error code (86h)

Originally introduced with the Phoenix BIOS v4.0, the above function is supported by most BIOSes, since various versions of Windows call it to find out about the system memory. A maximum of 20 bytes are transferred at one time, even if ECX is higher. The BIOS is permitted to return a nonzero continuation value in EBX and indicate that the end of the list has already been reached by returning with CF set on the next iteration. This function returns base memory and ISA/PCI memory contiguous with base memory as normal memory ranges. It indicates chipset-defined address holes that are not in use and motherboard memory-mapped devices, and all occurrences of the system BIOS as reserved; standard PC address ranges are not reported.

The XUMB memory is referred to as reserved type 3 and type 4 memory. Type 3 memory is ACPI Reclaim memory used by the ACPI operating system and type 4 memory is ACPI NVS memory.

Memory Compatibility Tests Should Do the Following.

System memory tests should use all functions described above to find out the memory present in the BIOS. Testing programs can only test type 1 memory. They should exclude testing of the reserved memory reported by the BIOS. If the tests also test the reserved memory reported by the system BIOS then there is a good chance that this will cause a system hang. Some memory tests that use the INT 15 E820 and INT 15 E801 interfaces before they start checking memory are AMIDIAG and CHECKIT.

Thus, a memory manager, method and computer system have been disclosed that that allow use of an XUMB memory space by system BIOS to store runtime code and data. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A memory manager for use with a system having a basic input/output system (BIOS) and an operating system, and having a memory comprising a base memory space located below A0000, AB memory segments located above the base memory space, and Upper Memory Block (UMB) memory space located above the AB memory segments and below 1 Megabyte, and an extended memory space located above 1 Megabyte, the memory manager comprising:

a code segment that allocates an Extended Upper Memory Block (XUMB) memory space within the extended memory space;

a code segment that finds space in the extended memory space for the XUMB memory space;

a code segment that zeroes out the XUMB memory space;

a code segment that stores the address of the XUMB memory space in a variable;

a code segment desiring to reserve memory in the XUMB memory space for a component of the BIOS that calls a predetermined calling function, reserves memory for the component in the XUMB memory space and allocates pointers to the specific memory addresses that are used by the component; and a code segment that copies data into the XUMB memory space.

2. The memory manager recited in claim 1 wherein the XUMB memory space is set up at TP_SETUP_WAD (0D3h).

3. The memory manager recited in claim 1 wherein the XUMB memory space is allocated in 4 KB memory blocks.

4. A method for use with a system having a basic input/output system (BIOS) and an operating system, and having a memory comprising a base memory space located below A0000, AB memory segments located above the base memory space, Upper Memory Block (UMB) memory space located above the AB memory segments and below 1 Megabyte, and an extended memory space located above 1 Megabyte, the method comprising:

allocating an Extended Upper Memory Block (XUMB) memory space within the extended memory space;

finding space in the extended memory space for the XUMB memory space;

zeroing out the XUMB memory space;

storing the address of the XUMB memory space in a variable;

calling a predetermined calling function when the XUMB memory space is to be reserved for a component of the BIOS;

reserving memory for the component in the XUMB memory space;

allocating pointers to the specific memory addresses that are used by the component; and copying data into the XUMB memory space.

5. The method recited in claim 4 wherein the XUMB memory space is set up at TP_SETUP_WAD (0D3h).

6. The method recited in claim 4 wherein the XUMB memory space is allocated in 4 KB memory blocks.

7. A computer system comprising:

a basic input/output system (BIOS) and an operating system;

a memory comprising a base memory space located below A0000, AB memory segments located above the base memory space, Upper Memory Block (UMB) memory space located above the AB memory segments and below 1 Megabyte, and an extended memory space located above 1 Megabyte; and a memory manager comprising one or more code segments that allocates an Extended Upper Memory Block (XUMB) memory space within the extended memory space, finds space in the extended memory space for the XUMB memory space, zeroes out the XUMB memory space, stores the address of the XUMB memory space in a variable, calls a predetermined calling function when the XUMB memory space is to be reserved for a component of the BIOS, reserves memory for the component in the XUMB memory space, allocates pointers to the specific memory addresses that are used by the component, and copies data into the XUMB memory space.

8. The computer system recited in claim 7 wherein the XUMB memory space is set up at TP_SETUP_WAD (0D3h).

9. The computer system recited in claim 7 wherein the XUMB memory space is allocated in 4 KB memory blocks.

* * * * *